May 30, 1950 G. SLAYTER 2,509,845
APPARATUS FOR FORMING RIBBONS OF GLASS AND
OTHER THERMOPLASTIC MATERIALS
Filed Dec. 9, 1942 2 Sheets-Sheet 1
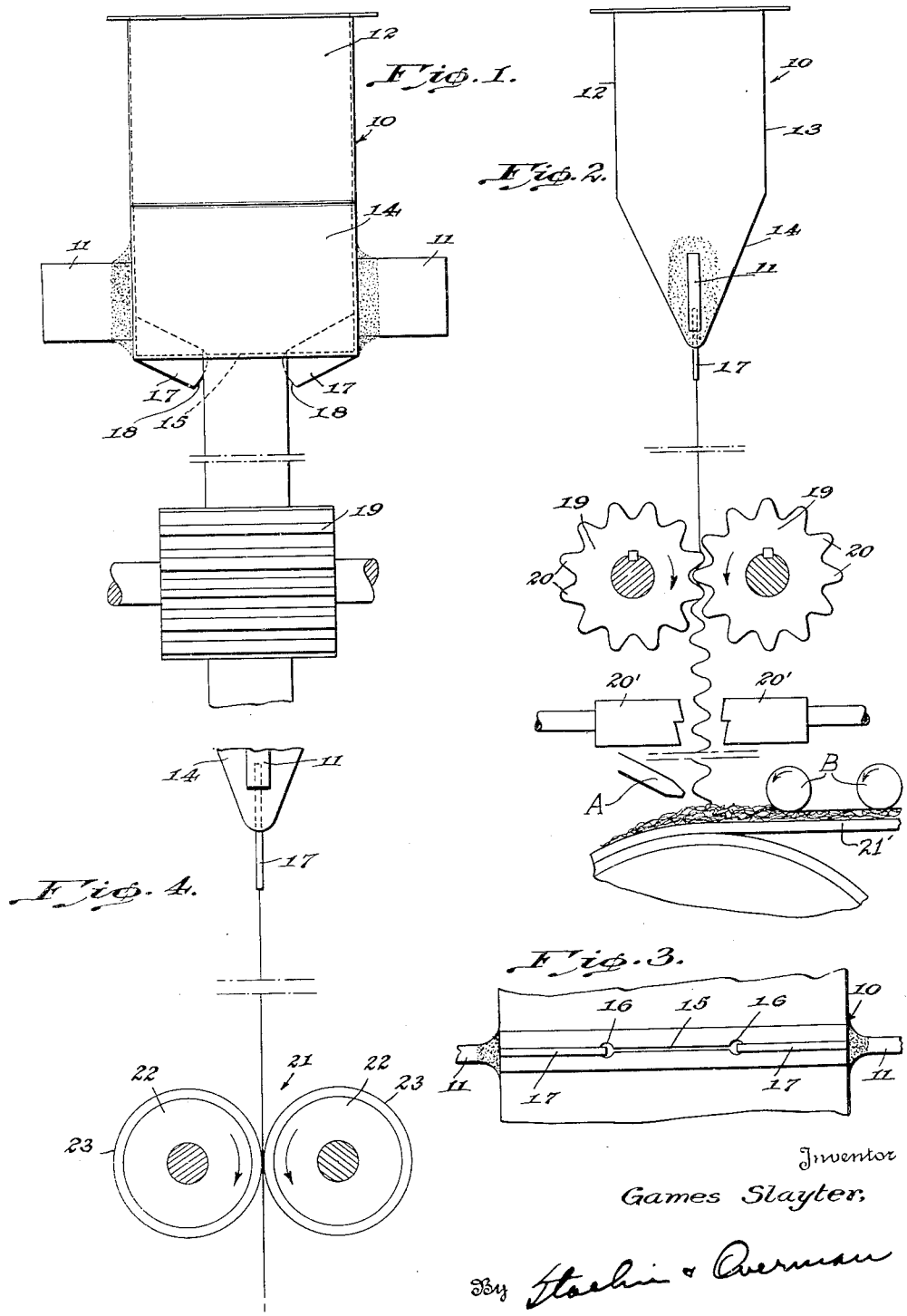
Inventor
Games Slayter,
By Stachin & Overman
Attorneys

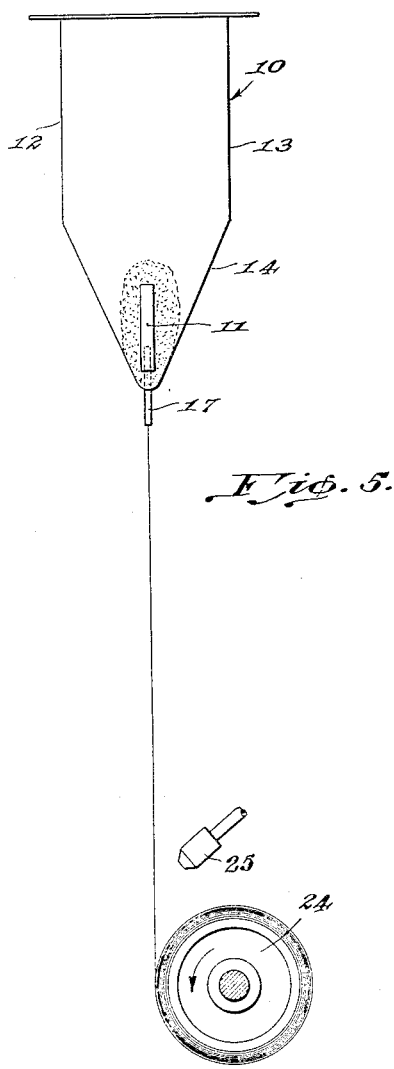
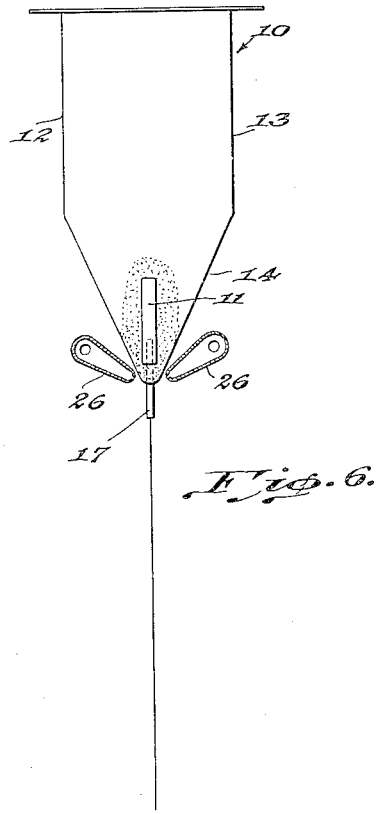

Patented May 30, 1950

2,509,845

UNITED STATES PATENT OFFICE 2,509,845

APPARATUS FOR FORMING RIBBONS OF GLASS AND OTHER THERMOPLASTIC MATERIALS

Games Slayter, Newark, Ohio, assignor to Owens-Corning Fiberglas Corporation, a corporation of Delaware Application December 9, 1942, Serial No. 468,443

9 Claims. (Cl. 49—17)

This invention relates generally to the manufacture of a very thin relatively wide film, sheet or ribbon of thermoplastic material such, for example, as glass.

One of the objects of this invention is to provide an improved apparatus for manufacturing a continuous length of thermoplastic ribbon which is not only uniformly thin throughout its length but is also of substantially uniform width.

Another object of this invention is to flow molten thermoplastic material, such as glass, through an opening in the form of an elongated relatively narrow slot to form a correspondingly shaped flat stream and to draw the stream into a greatly attenuated ribbon or sheet while it is integrally united with the supply of molten material. During the normal flow of such a flat stream of fluid molten glass, surface tension causes the stream naturally to seek a columnar shape, which is known generally as "necking down" or "necking in." Attenuation of a flat stream that is thus changing shape results in a glass ribbon that is not of uniform thickness throughout its width.

Still another object of this invention is to control the temperature of the material at opposite edge portions of the stream as it issues from the orifice or slot to overcome the tendency for the surface tension of the material to cause the stream to "neck down" at the delivery side of the orifice or slot.

Attenuated sheets or ribbons fabricated in accordance with this invention have numerous and diversified uses. For example, relatively thin ribbons of glass produced in accordance with this invention provide a highly satisfactory substitute for mica. This is a very important use because, comparatively speaking, mica is difficult to process and is not always available in the quantities required for its rather extensive commercial use. Another important use for relatively wide ribbons or sheets of glass produced by this invention is in the manufacture of condensers for electrical equipment. The present invention enables very thin glass sheets of varying dimension to be readily produced at a cost considerably less than heretofore thought possible with conventional fabrication methods.

Another use for the product under consideration is to substitute the film or ribbons of glass for the fine glass fibers or filaments employed in the manufacture of glass wool for heat insulating materials. In producing glass fibers for the above purpose, it has been customary to provide a bushing having a multiplicity of outlet openings or orifices and to flow glass streams through the orifices and attenuate the streams to form filaments or fibers. The maximum quantity of material that may be attenuated into fine fibers or filaments with one attenuating device is considerably less than the amount of material capable of being fed through a narrow relatively long orifice or slot in the bushing to form a sheet or ribbon. Thus, the use of thin relatively wide glass ribbons or sheets instead of fine fibers or filaments renders it possible to substantially increase the production of glass wool for each attenuating device.

A further object of this invention is to impart a crimped or sinuous contour to the ribbon or sheet as it is being drawn or attenuated. This feature renders it possible to produce an integrated body or mass of intermatted or tangled strips or ribbons of thermoplastic material which has for one of its peculiar properties the ability to inhibit the passage of convection currents and drafts through the material. This is apparently due to the relatively great width of the ribbons and to the fact that the crimped ribbons form quiescent air pockets in the body or mass. These air pockets also tend to prevent transfer of heat by conduction.

It is a further object, therefore, to provide apparatus for producing an improved thermal insulation in the form of masses of intermatted or otherwise arranged thin ribbons of glass.

The foregoing, as well as other objects, will be made more apparent as this description proceeds, especially when considered in connection with the accompanying drawings, wherein:

Figure 1 is a diagrammatic front elevational view of suitable apparatus for manufacturing a thin relatively wide ribbon or sheet of thermoplastic material;

Figure 2 is a diagrammatic side elevational view of the apparatus shown in Figure 1;

Figure 3 is a bottom view of the bushing shown in Figure 1;

Figure 4 is a semi-diagrammatic side elevational view of a slightly modified construction;

Figure 5 is a semi-diagrammatic view of a further embodiment of this invention; and Figure 6 is a fragmentary elevational view of a further modification of this invention.

While the present invention may be advantageously employed in connection with the fabrication of many different types of materials which are molten at a high temperature and which gradually increase in viscosity and solidify when cooled, nevertheless, it finds particular utility when used in fabricating ribbons of glass.

In the several figures of the drawings, the reference character 10 indicates a bushing preferably formed of metal and adapted to contain a supply of molten thermoplastic material such, for example, as glass. The bushing is heated to maintain the body of thermoplastic material therein at the proper temperature and is preferably electrically heated. For this purpose a pair of terminals 11 are respectively integrally connected to opposite ends of the bushing and are adapted to connect the bushing in a suitable electric circuit, not shown.

Upon reference to Figure 2 of the drawings, it will be noted that the front and rear walls 12 and 13 of the bushing have portions adjacent the bottom of the bushing which converge to form in effect a trough 14. The bottom of the trough 14 is formed with a narrow relatively long orifice or slot 15 having enlarged openings 16 at each end thereof.

The purpose of the elongated slot or orifice 15 is to enable molten glass to flow downwardly from the bushing 10 in the form of a thin relatively wide stream. Due to the surface tension of the glass passing through the orifice 15, there is a tendency for the opposite edge portions of the stream to thicken and cause the stream to "neck down" as it issues from the orifice. Such action is, of course, objectionable because it seriously interferes with producing a ribbon or sheet of a specified uniform thickness and width.

In accordance with the present invention, the tendency for the stream to "neck down" as it issues from the orifice 15 is counteracted by controlling the temperature of the material at the opposite edges of the stream during passage of the stream through the orifice. This is accomplished by providing a pair of heat radiating fins 17 respectively secured adjacent opposite edges of the stream in heat conducting relationship to the bushing 10. The fins are of a metal capable of being wetted by molten glass at elevated temperatures, preferably platinum or platinum alloy.

Upon reference to Figure 3 it will be noted that the fins 17 are positioned in a common plane including the plane of the elongated slot or orifice 15 and the adjacent or inner ends of the fins respectively project into the openings 16 at the opposite ends of the slot or orifice 15. The thickness of the adjacent or inner end portions of the fins 17 is so determined with respect to the diameter of the openings 16 to enable molten glass to wet both sides of the fins as it flows through the orifice 15. As a result, the molten glass at the opposite edges of the streams is heated by the fins and, in effect, is drawn laterally outwardly to counteract any tendency for the stream to "neck down" in response to surface tension. It will also be noted that the adjacent or inner ends of the fins extend below the bottom wall of the trough 14 and the inner edges 18 extend outwardly with respect to the adjacent edges of the stream to enable the glass to "strip off" of the fins as it is drawn through the orifice 15. In connection with the ability of the glass to "strip off" of the fins, attention is called to the fact that the ribbon of glass is stripped from the fins at the point or points where the extent of wetting of the fins by the glass is at a minimum. Thus, by controlling the temperature of the bushing and consequently the fins, it is possible to strip the glass off the fins at practically any desired point along the length of the fins.

The glass stream issuing from the orifice of the bushing 14 is attenuated into a ribbon or sheet by applying traction on the ribbon in a downward direction. In the embodiment of the invention shown in Figures 1 and 2, the glass stream is attenuated by a pair of coacting intermeshing toothed elements 19 respectively rotatably supported at opposite sides of the path of travel of the ribbon or sheet. The teeth 20 on the elements 19 intermesh without actually contacting each other and thereby provide a circuitous passage therebetween through which the glass ribbon or sheet is directed.

It follows from the foregoing that the intermeshing teeth 20 on the coacting attenuating elements 19 crimp or impart a sinuous contour to the ribbon or glass passing therebetween. Whether the undulations in the ribbon are permanent depends to a great extent upon the temperature of the glass passing between the attenuating elements 19 and also depends to some extent upon the degree of intermeshing of the teeth 20 on the attenuating elements 19. Therefore, if the temperature of the glass issuing from between the toothed elements 19 is above what may be termed the "softening point," the ribbon may have a tendency to again straighten out as it leaves the coacting toothed elements. On the other hand, if the temperature of the glass leaving the coacting attenuating elements 19 is below the so-called "softening point," the undulations formed by the coacting attenuating elements will have a tendency to remain in the ribbon.

In practice, however, I prefer to install a blower 20' immediately below the attenuating elements 19. The blower 20' communicates with a source of fluid under pressure (not shown) and discharges the fluid in a downward direction against opposite sides of the glass ribbon emanating from the attenuating elements. The force of the fluid impinging on opposite sides of the ribbon is variable and may be substantially the same as the traction force applied to the ribbon by the attenuating elements 19 or may be less or greater than this force. If the force of the fluid acting on opposite sides of the ribbon is less than the propelling force applied by the attenuating elements 19, a force reaction results which causes the undulations to pile up on each other to thereby increase the degree of crimp in the ribbon. On the other hand, if the traction force applied to the ribbon by the fluid is equal to or slightly greater than the traction force applied to the ribbon by the attenuating elements, the force reaction becomes negligible and a slightly crimped or a straight ribbon results. It follows from the above that the degree of crimp depends to a great extent on the differential between the traction force applied by the attenuating elements and the velocity of the fluid supplied by the blower 20'.

Regardless of whether the ribbon is crimped or straight, it is of a nature which permits collecting the same on a conveyor, drum or other collecting surface to form a mat or mass of haphazardly arranged ribbons. In Figure 2 of the drawing the ribbons are shown as collected on a conveyor 21', which may be of any desired type, for instance, similar to that shown generally in the Slayter Patent No. 2,230,272 dated February 4, 1941. If desired, a suitable binder or an adhesive may be applied to the mass or mat of ribbons by means of a spray gun A as or after the ribbons are deposited and the mat may be compressed by rolls B to form a sheet of insulating material. Similar mechanism is also shown in the Slayter patent.

The dimension of the ribbon produced depends upon a number of variable factors one of which, of course, is the dimension of the slot or orifice 15. While the dimension of the slot or orifice 15 may vary over a wide range depending upon the particular size of ribbon desired, nevertheless, particularly satisfactory results have been obtained by employing an orifice or slot 15 which is approximately one or more inches long and .020 to .040 of an inch wide. When employing a slot or orifice 15 of the above dimension, the openings 16 at the opposite ends of the slot should approximate .060 to .090 of an inch in diameter and the adjacent or inner ends of the fins 17 should be substantially .040 to .065 of an inch in width or, in other words, the width of the portions of the fins projecting into the openings 16 should be sufficiently less in width than the diameter of the openings to enable the molten glass to flow over opposite marginal sides of the fins in sufficient volume to insure substantially uniform flow of the glass throughout the entire length of the slot including the openings 16. A construction of the above type when used in combination with attenuating elements rotating at a circumferential speed of approximately 12,000 feet per minute produces a ribbon of glass which is uniformly very thin and relatively wide. These examples, of course, are merely illustrative and not limitations.

In Figure 4 of the drawings I have shown a slightly modified form of apparatus for producing a very thin relatively wide ribbon or sheet of glass. The difference between the construction shown in Figure 4 and the one previously described is that the attenuating means 21 is in the form of a pair of rolls 22 having smooth cylindrical surfaces 23 which may be rubber-covered, if desired. The rolls 22 are respectively supported at opposite sides of the ribbon for rotation in opposite directions at the desired attenuating speed and the external or cylindrical surfaces 23 cooperate to supply sufficient traction force on the ribbon passing therebetween to attenuate the stream of glass issuing from the bushing 10.

In Figure 5 of the drawings I have shown a construction which may be successfully used to not only attenuate the stream of glass to form the desired ribbon but for also packaging the ribbon. In detail, a drum 24 is supported below the bushing 10 for rotation in the direction indicated by the arrow in Figure 5 and the ribbon of glass is wound around the drum. Thus, the drum performs the dual function of packaging the ribbon and attenuating the stream of glass issuing from the bushing 10. One or more spray heads 25 may be located adjacent the drum to direct sprays of oil or other lubricant, or other treating material, onto the ribbon as it moves toward the drum.

The embodiment of the invention shown in Figure 6 illustrates a pair of flat, elongated air blowers 26 respectively supported at opposite sides of the trough 14 on the bushing for directing jets of air against the lower ends of the converging walls of the trough. The air is directed in a downward direction against opposite sides of the stream of glass flowing from the slot or orifice 15. The air blasts directed against opposite sides of the stream as it issues from the orifice 15 tend to inhibit thickening of the glass and thereby assist the heat radiating fins in counteracting the tendency for the glass stream to "neck down" as it issues from the orifice 15.

Glass or other thermoplastic materials fabricated in accordance with the above may be used for a number of different purposes and the present invention is not limited to any one specific application of the material. However, one particularly advantageous use for materials of the above type is in the manufacture of thermal insulation. Either crimped or straight ribbons may be deposited in haphazard fashion on a suitable collecting surface, such as a conveyor, as they are formed. The ribbons double back and forth in haphazard arrangement as they reach the surface and form a highly resilient intertangled mass. For best results in the production of mats, the ribbons are approximately one to three inches in width, although other sizes are usable. The ribbons of the collected mass may be bonded together by means of a suitable adhesive as previously described and the mass may be compressed to the desired density and the adhesive set or cured by any suitable means to form an integral resilient mat or board. This resilient body has heat insulating characteristics superior for some applications to the usual glass filaments or fibers heretofore employed for this purpose. Regardless of whether the ribbon is straight or crimped, it has a substantially greater width than the fibers and affords more resistance to the passage of convection currents and drafts through the material and forms many quiescent air pockets throughout the body.

The substitution of thin relatively wide ribbons of glass for the fibers heretofore employed also reduces the cost of manufacture because it enables producing a greater weight of glass from a single attenuating device. For example, if the slot in the bushing is of a size sufficient to produce a ribbon of glass having a width of approximately one inch and a thickness of substantially .0002 of an inch, the weight of the glass forming this ribbon is the equivalent of about 5,000 glass filaments or fibers having diameters of approximately .0002 of an inch. The production of 5,000 glass filaments or fibers requires a number of attenuating devices and involves considerably more handling in production than the glass ribbon or sheet previously described.

The term thin ribbon or sheet as employed in the present description and claims is used to designate a product of .0002 to .001 inch, more or less, in thickness and of a width greater than approximately 1,000 times the thickness.

Various modifications may be resorted to within the spirit of the invention and the scope of the claims.

I claim:

1. Apparatus for producing a thin sheet of thermoplastic material, comprising a member adapted to contain a supply of molten thermoplastic material and having a discharge orifice in the form of a narrow elongated slot through which molten thermoplastic material flows in the form of a thin relatively wide stream, and fins supported at and projecting outwardly from the delivery side of the slot adjacent opposite ends of the slot in positions to be wetted by the thermoplastic material as the stream flows from the slot.

2. Apparatus for producing a thin relatively wide ribbon of glass, comprising a bushing adapted to contain a supply of molten glass and having an outlet opening in the form of a narrow elongated slot through which the molten glass flows in the form of a thin relatively wide stream, outwardly extending fins supported at the delivery side of the slot adjacent opposite ends of the slot in positions to be wetted by the glass as the stream flows from the slot and means for heating the fins.

3. Apparatus for producing a thin relatively wide ribbon of glass, comprising a bushing adapted to contain a supply of molten glass and having an outlet opening in the form of a narrow elongated slot through which the molten glass flows in the form of a thin relatively wide stream, and depending fins mounted on the bushing in heat conducting relation thereto and supported at the delivery side of the slot adjacent opposite ends of the slot in positions to be wetted by the glass as the stream flows from the slot.

4. Apparatus for producing a thin relatively wide ribbon of thermoplastic material, comprising an electrically heated bushing adapted to contain a supply of molten thermoplastic material and having an outlet opening in the form of a narrow relatively long slot through which the material flows in the form of a stream, and heat radiating fins supported in the heat conducting relation to the bushing at opposite ends of the slot and having portions positioned to be wetted by the thermoplastic material to inhibit the tendency of the stream to "neck down" as the stream flows from the slot.

5. Apparatus for producing a thin sheet of thermoplastic material, comprising a member adapted to contain a supply of molten thermoplastic material and having a discharge orifice in the form of a narrow elongated slot through which molten thermoplastic material flows in the form of a thin relatively wide stream, fins respectively extending into the path of flow of the stream from opposite sides of said path to contact the thermoplastic material at opposite edges of the stream, and means for heating the fins.

6. Apparatus for producing a thin relatively wide ribbon of glass, comprising a bushing adapted to contain a supply of molten glass and having an outlet opening in the form of a narrow elongated slot through which the molten glass flows in the form of a thin relatively wide stream, and fins supported in heat conducting relation to the bushing and having portions respectively extending into opposite ends of the slot to require the glass at opposite edges of the stream to flow over the same.

7. Apparatus for producing a thin sheet of thermoplastic material, comprising a container adapted to contain a supply of molten thermoplastic material, a discharge orifice for the container in the form of a narrow relatively long slot through which the thermoplastic material flows in the form of a thin relatively wide stream and having enlarged openings at opposite ends, and heat radiating fins respectively projecting into the openings in a manner to require the thermoplastic material at opposite edges of the stream to flow over the fins.

8. Apparatus for producing a thin sheet of thermoplastic material, comprising a receptacle adapted to contain a supply of molten thermoplastic material and having a discharge orifice in the form of a narrow elongated slot through which molten thermoplastic material flows in the form of a thin relatively wide stream, a member disposed within each end of the slot for heating the edges of said stream as it is formed, and means for attenuating the stream as it flows from the slot by directing pressure on opposite sides of the stream in the direction of travel of the stream.

9. Apparatus for producing a thin sheet of thermoplastic material, comprising a member adapted to contain a supply of molten thermoplastic material and having a discharge orifice in the form of a narrow elongated slot through which molten thermoplastic material flows in the form of a thin relatively wide stream, fins mounted on the member in heat conducting relation thereto and supported at the delivery side of the slot adjacent opposite ends of the slot in positions to be wetted by the thermoplastic material as the stream flows from the slot, and means for directing fluid under pressure against opposite sides of the stream in the general direction of travel of the stream from the slot.

GAMES SLAYTER.

REFERENCES CITED

The following references are of record in the file of this patent:

UNITED STATES PATENTS

| Number | Name | Date |
| --- | --- | --- |
| Re. 13,804 | Hitchcock | Sept. 29, 1914 |
| 720,517 | Frink et al. | Feb. 10, 1903 |
| 1,087,154 | Whittemore | Feb. 17, 1914 |
| 1,402,145 | Callard | Jan. 3, 1922 |
| 1,489,876 | Whittemore | Apr. 8, 1924 |
| 1,753,768 | Blair | Apr. 8, 1930 |
| 1,823,357 | Frink | Sept. 15, 1931 |
| 2,068,203 | Simpson | Jan. 19, 1937 |
| 2,133,183 | Baird et al. | Oct. 11, 1938 |
| 2,133,236 | Slayter et al. | Oct. 11, 1938 |
| 2,212,528 | Slayter | Aug. 27, 1940 |
| 2,276,615 | Hazelett | Mar. 17, 1942 |
| 2,291,289 | Slayter et al. | July 28, 1942 |

FOREIGN PATENTS

| Number | Country | Date |
| --- | --- | --- |
| 169,136 | Great Britain | Oct. 20, 1921 |
| 512,700 | Great Britain | Sept. 22, 1939 |